United States Patent [19]
Bealkowski et al.

[11] Patent Number: 5,636,352
[45] Date of Patent: Jun. 3, 1997

[54] METHOD AND APPARATUS FOR UTILIZING CONDENSED INSTRUCTIONS

[75] Inventors: Richard Bealkowski; Michael R. Turner, both of Austin, Tex.

[73] Assignee: International Business Machines Corporation, Armonk, N.Y.

[21] Appl. No.: 357,835

[22] Filed: Dec. 16, 1994

[51] Int. Cl.[6] ................................. G06F 9/30
[52] U.S. Cl. ................................. 395/384
[58] Field of Search .......... 364/DIG. 1 MS File, 364/DIG. 2 MS File; 395/612, 376, 381, 384, 385, 386

[56] References Cited

U.S. PATENT DOCUMENTS

| | | | |
|---|---|---|---|
| 4,773,039 | 9/1988 | Zamora | 364/419.14 |
| 4,835,679 | 5/1989 | Kida et al. | 395/375 |
| 5,019,967 | 5/1991 | Wheeler et al. | 395/775 |
| 5,440,701 | 8/1995 | Matsuzaki et al. | 395/375 |
| 5,463,746 | 10/1995 | Brodnax et al. | 395/375 |

OTHER PUBLICATIONS

IBM TDB "Opcode Remap and Compression in Hard-Wired RISC Microprocessor", vol. 32, No. 10A, Nov. 1990, p. 349.

*Primary Examiner*—Robert B. Harrell
*Attorney, Agent, or Firm*—Paul S. Drake

[57] ABSTRACT

A method and apparatus for executing a condensed instruction stream by a processor including receiving an instruction including an instruction identifier and multiple of instruction synonyms within the instruction, generating at least one full width instruction for each instruction synonym, and executing by the processor the generated full width instructions.

15 Claims, 5 Drawing Sheets

METHOD AND APPARATUS FOR UTILIZING CONDENSED INSTRUCTIONS

TECHNICAL FIELD

The present invention relates generally to utilizing condensed instructions and more particularly to increasing the instruction flow to a processor from a memory.

BACKGROUND ART

One of the bottlenecks in system performance is feeding instructions to a processor for execution. Traditionally, performance problems associated with retrieving instructions for execution have been addressed by utilizing various levels of caching. Still, access to system RAM and hard disks poses certain performance limitations with regards to retrieving instructions for execution by the processor.

There are two primary types of microprocessor architectures popular in the industry today. These two types are Complex Instruction Set Computer (CISC) and Reduced Instruction Set Computer (RISC). The most popular of the CISC type microprocessors belong to the x86 family of microprocessors produced by Intel and various other companies today. A popular RISC-type microprocessor is the PowerPC 601 (trademark of IBM Corp.). Due to the nature of CISC architecture, the x86 family of microprocessors utilize a variable-length instruction word. However, the PowerPC 601 and other RISC type microprocessors utilize fixed-length instruction words. As a result, it is commonly observed that RISC-type programs occupy a greater amount of storage space than CISC-type programs. Consequently, RISC-type microprocessors are disadvantaged by the greater amount of instruction words that must be fetched, on average, when compared to a CISC-type microprocessor.

SUMMARY OF THE INVENTION

The present invention includes a method and apparatus for executing a condensed instruction stream by a processor including receiving an instruction including an instruction identifier and multiple of instruction synonyms within the instruction, generating at least one full width instruction for each instruction synonym, and executing by the processor the generated full width instructions.

A further understanding of the nature and advantages of the present invention may be realized by reference to the remaining portions of the specification and the drawings.

DISCLOSURE OF THE INVENTION

The following detailed description is of the best presently contemplated mode for carrying out the invention. This description is not to be viewed in a limiting sense, but is made merely for the purpose of illustrating the general principles of the invention, the scope of which is only defined by the appended claims.

Figure 1:
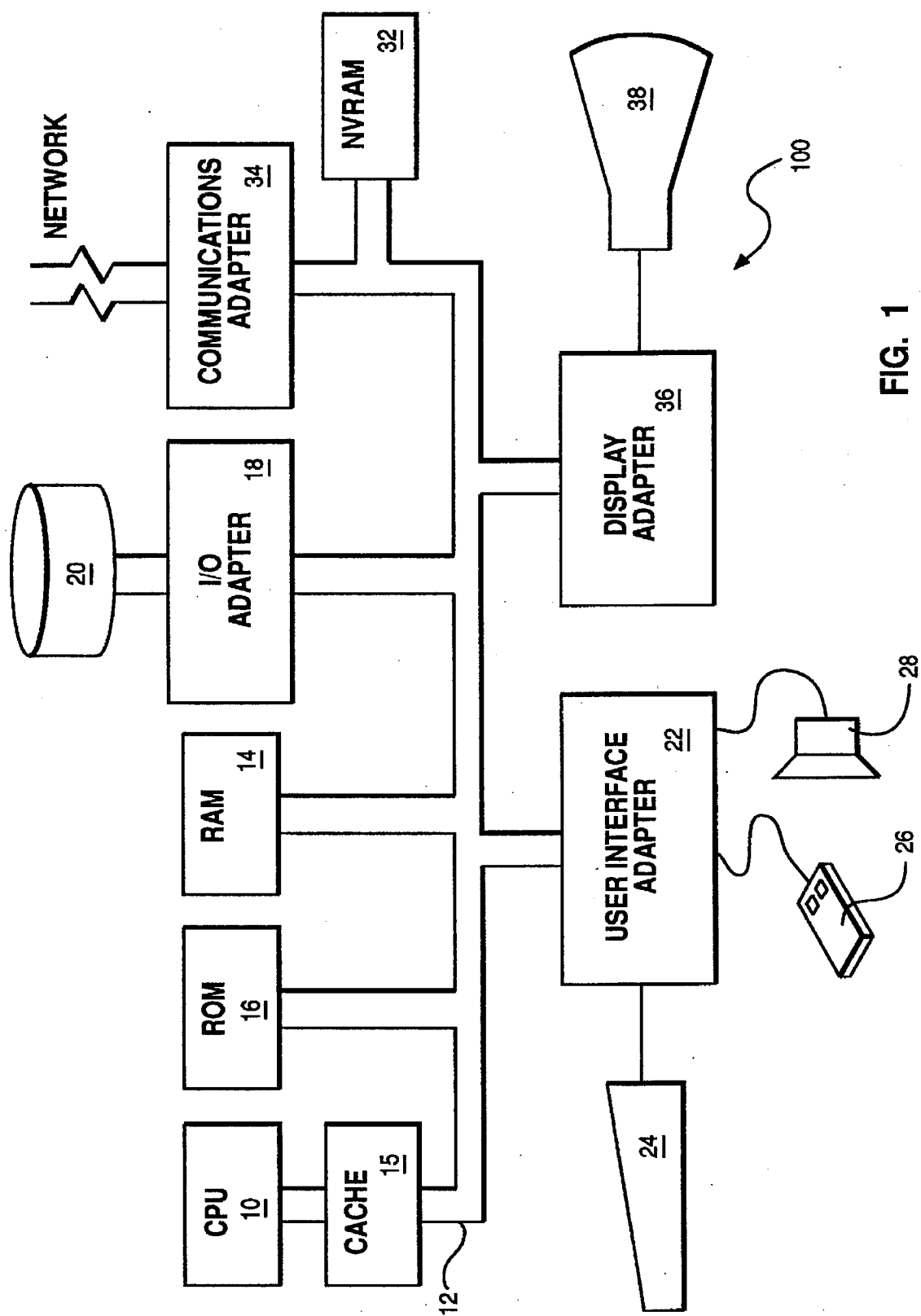
FIG. 1 is a diagram of a typical digital workstation which utilizes the present invention.

The preferred embodiment is practiced in any suitable hardware configuration such as the hardware configuration shown in FIG. 1. Workstation 100 includes any suitable central processing unit 10, such as a PowerPC 601, and a number of other units interconnected via a system bus 12. Illustratively, workstation 100 includes random access memory (RAM) 14, cache 15, read only memory (ROM) 16, nonvolatile random access memory (NVRAM) 32, display adapter 36 for connecting system bus 12 to display device 38, and I/O adapter 18 for connecting peripheral devices, such as disk drives 20 to system bus 12.

Workstation 100 further includes user interface adapter 22 for connecting user controls (e.g., keyboard 24, mouse 26, speaker 28, and/or other user interface devices, such as a touch screen device) to system bus 12. Communication adapter 34 connects workstation 100 to a data processing network. Any suitable operating system (OS) may direct the operation of workstation 100. However, in the preferred embodiment, the AIX (Trademark of IBM Corp.) operating system controls workstation 100.

Figure 2:
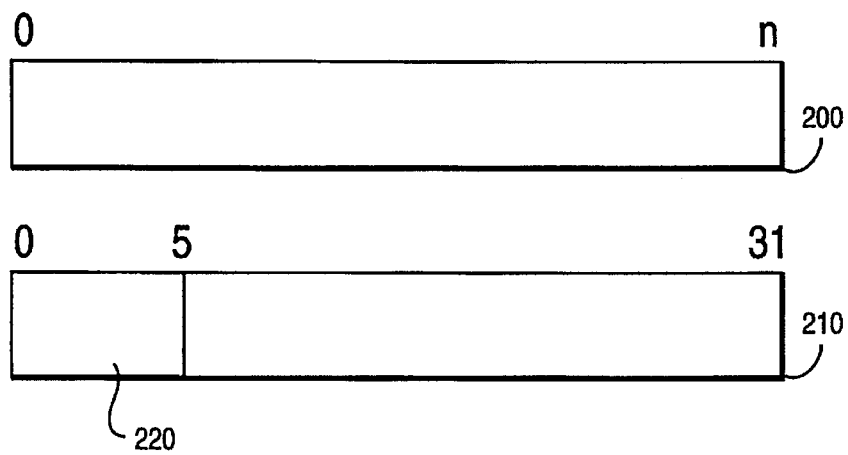
FIG. 2 is a block diagram of a standard instruction cell in accordance with the present invention.

Referring now to FIG. 2, there is shown a standard instruction cell 200 which is used to contain a desired instruction for execution by the system processor. For the PowerPC 601 RISC-style microprocessor, the width of the instruction cell is thirty-two bits. A view of the well known PowerPC 601 microprocessor instruction cell is shown at cell 210. Instructions are four bytes long (32 bits) and word-aligned. Bits 0–5 of the instruction word specify the primary opcode 220. Some instructions may also have a secondary opcode to further define the first opcode. The remaining bits of the instruction contain one or more fields for the different instruction formats.

Figure 3:
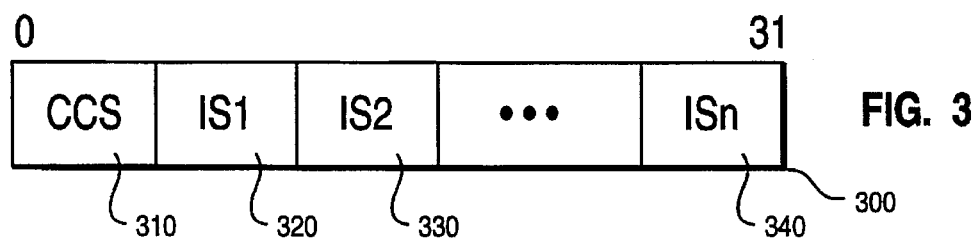
FIG. 3 is a block diagram of a condensed instruction cell in accordance with the present invention.

Referring now to FIG. 3, there is shown a Condensed Instruction Cell 300 of the present invention. A Condensed Instruction Cell 300 is comprised of a Condensed Cell Specifier (CCS) 310 and one or more Instruction Synonyms (IS) as shown by IS1 320, IS2 330, through ISn 340. An instruction synonym is, typically, a shorter (in total bit count) value used to represent the value of a full width instruction cell.

Figure 4:
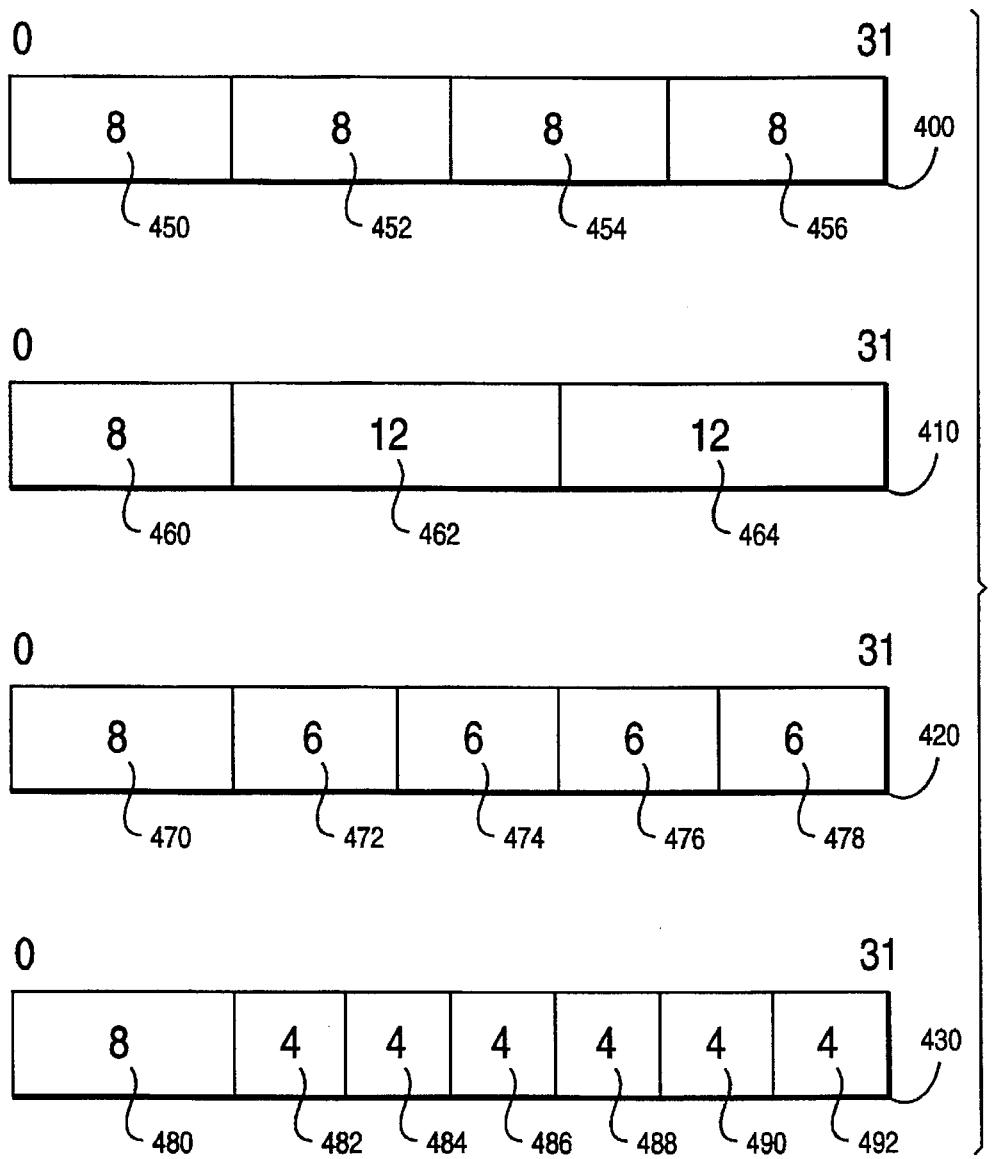
FIG. 4 is a block diagram of a representative set of condensed instruction cells in accordance with the present invention.

Referring now to FIG. 4, there is shown diagrams of Condensed Instruction Cells with specific bit width assignments. Condensed Instruction Cell 400 is a 32-bit cell with an 8-bit CCS 450 and three 8-bit Instruction Synonyms 452 454 456. Condensed Instruction Cell 410 is a 32-bit cell with an 8-bit CCS 460 and two 12-bit Instruction Synonyms 462 and 464. Condensed Instruction Cell 420 is a 32-bit cell with an 8-bit CCS 470 and four 6-bit Instruction Synonyms 472–478. Condensed Instruction Cell 430 is a 32-bit cell with an 8-bit CCS 480 and six 4-bit Instruction Synonyms 482–492. The CCS is chosen to be unique for each cell type.

When applying this invention to the PowerPC 601 microprocessor, an 8-bit CCS is comprised of two subfields. The first field corresponds directly to the primary opcode field bit 0–5. The second field is the remaining two bits, bits 6–7. A CCS is chosen so that no conflict occurs between the value contained in first field of the CCS (bits 0–5) and the established primary opcode values already utilized by the PowerPC 601 processor.

Figure 5:
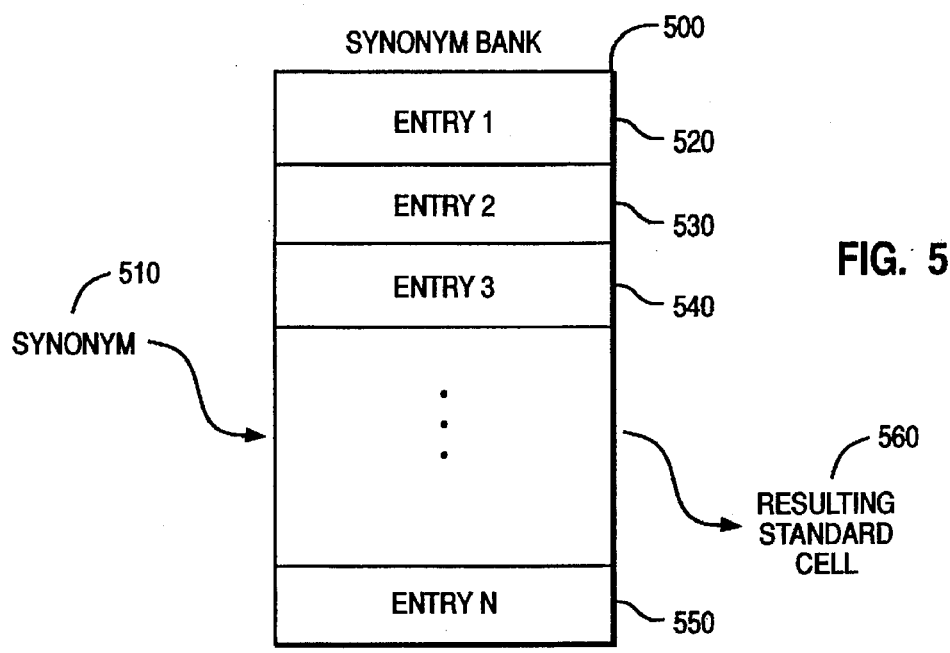
FIG. 5 is a block diagram of a synonym bank in accordance with the present invention.

Referring now to FIG. 5, there is shown a Synonym Bank of the present invention. Synonym Bank 500 contains the full width standard cell values, entry 1 (520) through entry n (550), each of which corresponds to one Instruction Synonym. The value of a selected synonym 510 is used to select an entry (520–550) in Synonym Bank 500. The selection process results in a Resulting Standard Cell value 560 being produced which will subsequently be added to the processor's instruction queue, described in detail below in conjunction with FIG. 7 and FIG. 8. Preferably, the entries 520–550 are sorted so that the most common instruction is stored in the first location, the next most common in the second location, and so on. A sorted synonym bank allows for a smaller bit-width synonym to be used for the most common synonym bank entries.

It is preferred that a synonym value be reserved to represent a null entry. This null entry, when encountered, will not cause an entry to be made into the instruction queue. For illustrative purposes the null synonym value is defined to be zero. The null synonym is useful in cases where all the synonym locations within a condensed instruction cell are not used.

A plurality of Synonym Banks 500 may also be incorporated into a single design. When multiple synonym banks are employed, the CCS 310 is used to select banks as well as specify cell type.

Figure 6:
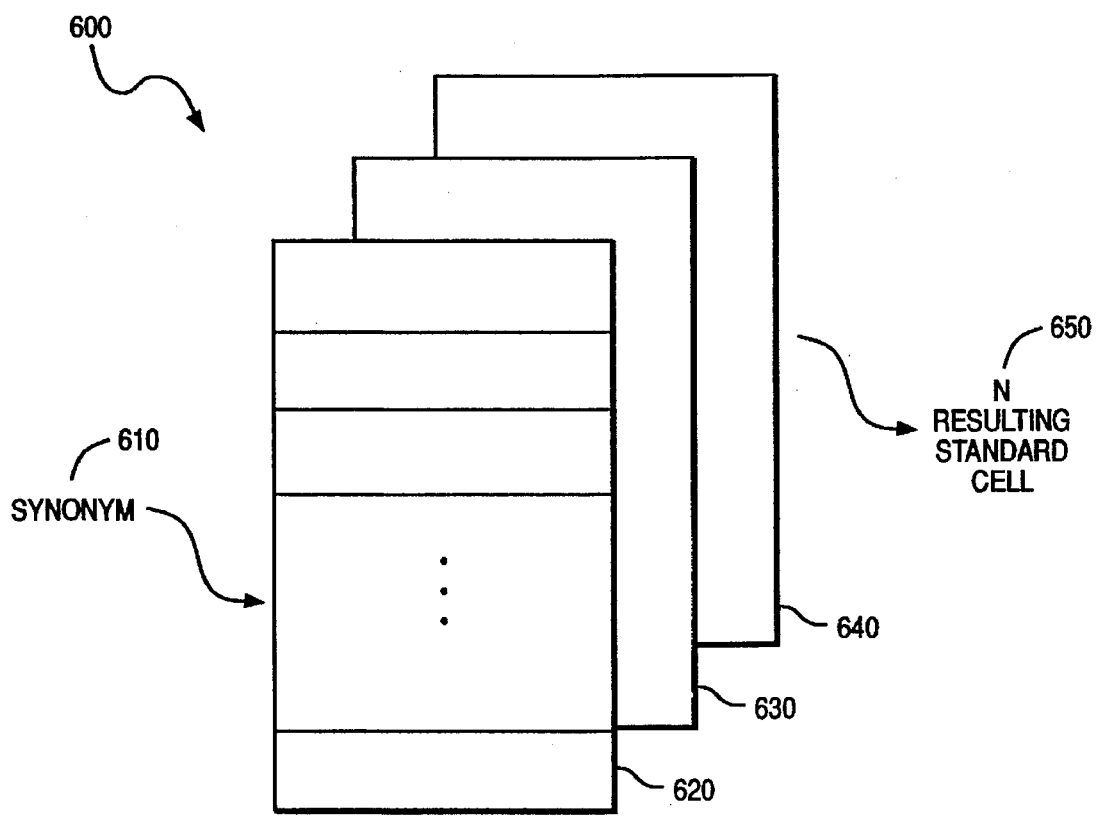
FIG. 6 is a block diagram of a multilevel synonym bank in accordance with the present invention.

Referring now to FIG. 6, there is shown a multi-level Synonym Bank 600. The multi-level Synonym Bank works 600 works much like the single-level Synonym Bank 500 except that a plurality of Resulting Standard Cell values 650 are produced. That is, each synonym may refer to multiple instructions for execution in sequence. A synonym 610 is used as before, however, the bank is organized with a plurality of entries 620–640 per synonym. In an alternative embodiment, a single instruction bank may be utilized with links between entries to provide the capability of multiple instructions for selected synonyms.

Figure 7:
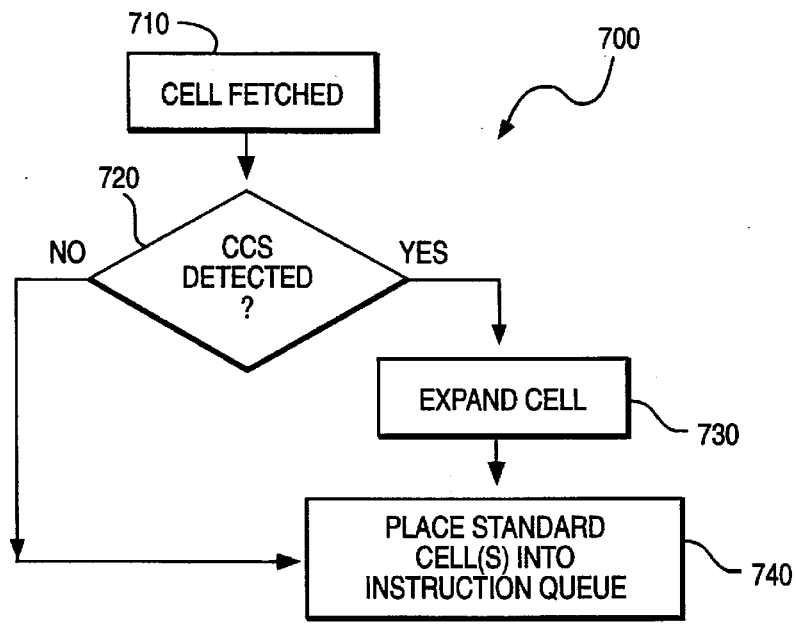
FIG. 7 is a flow diagram of a condensed cell expansion method in accordance with the present invention.

Referring now to FIG. 7, there is shown a flow diagram of a synonym expansion method 700. A typical instruction fetch is performed, step 710. The cell is examined to determine if a Condensed Cell Specifier is detected, step 720. If a Condensed Cell Specifier is detected in step 720 the method proceeds to step 730. In step 730 the condensed cell is expanded as described previously with reference to FIG. 5 and FIG. 6. The Resulting Standard Cell or Cells are then added, preferably in sequence, to the instruction queue, step 740. If no Condensed Cell Specifier was detected in step 720 then the cell is a Standard Cell and the method proceeds to step 740 where the cell is added to the instruction queue.

Figure 8:
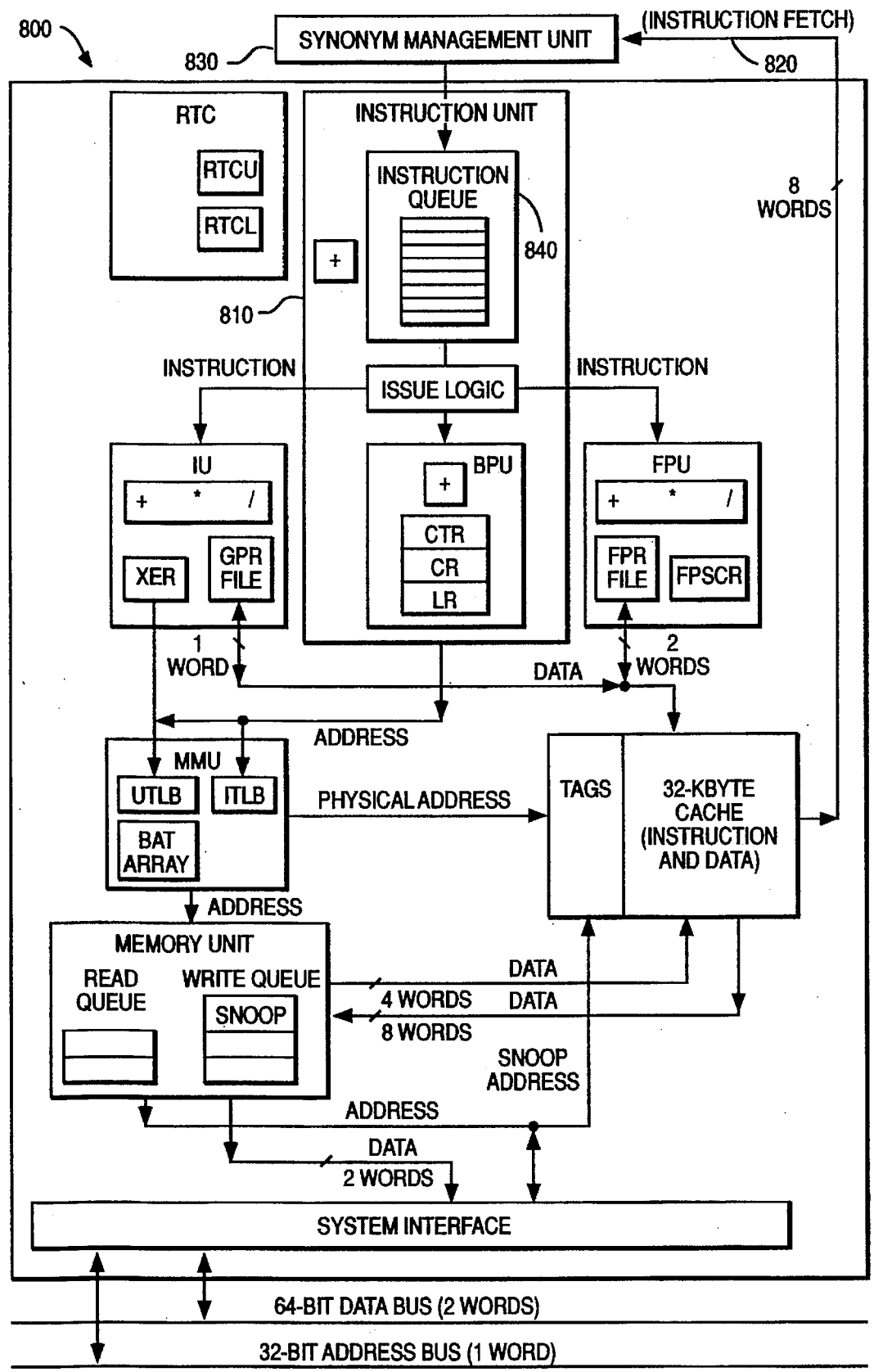
FIG. 8 is a block diagram of a RISC-type microprocessor showing the addition of a synonym management unit in accordance with the present invention.

Referring now to FIG. 8, there is shown a block diagram of a PowerPC 601 microprocessor 800 (PowerPC 601 RISC Microprocessor User's Manual published by IBM Microelectronics and Motorola, Rev 1 which is hereby included by reference), which has been enhanced to incorporate the present invention. As stated above, PowerPC instructions are encoded as single-word (32-bit) opcodes and instruction formats are consistent among all instruction types. The PowerPC instructions are divided into the following instruction categories: integer, floating-point, load/store, flow control, processor control, and memory control.

Enhanced processor 800 contains the Synonym Management Unit 830 of the present invention. The Synonym Management Unit 830 determines if a fetched cell is to be expanded or passed-through, and if expansion is required performs the expansion. The Synonym Management Unit 830 is incorporated into processor 800 between the instruction queue 840 and the Instruction Fetch 820. This can all be contained within the Instruction Unit 810 or can be a functional unit outside of the Instruction Unit 810.

The values of the entries in the synonym bank or banks can be predetermined at the time the microprocessor is designed and possible stored in a read only memory in the microprocessor or hardwired as instruction synonyms. However, it is preferred that the synonym bank be loadable storage within the microprocessor. Preferably, the synonym bank is implemented using high-speed internal register-type storage. The synonym bank registers are loaded via software. The software loading the synonym bank can be software included with the operating system initialization routines. It is also desirable to include a control bit to enable or disable the operation of the Synonym Management Unit 830.

There are many advantages to the present invention. For example, if the instructions are condensed during compilation of a program, the compiled program will require less storage space. In addition, the condensed instructions will require less bandwidth to transmit them across the system bus to the processor for execution. Furthermore, the present invention is flexible to handle optimization techniques by compiler technology to minimize program storage space and retrieval time.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A computer system for executing a condensed instruction stream comprising:

a processor for executing instructions;

a memory for storing instructions for execution by said processor;

means for receiving an instruction including an instruction identifier and a plurality of instruction synonyms within the instruction;

means for generating at least one full width instruction for each instruction synonym; and means for executing by said processor said generated full width instructions.

2. The computer system of claim 1 wherein the means for generating includes means for utilizing each said instruction synonym for retrieving at least one full width instruction from a storage bank.

3. The computer system of claim 2 wherein said storage bank is statically stored in read only memory in the processor.

4. The computer system of claim 2 further comprising means for receiving instructions to preload the storage bank prior to execution of the instruction stream.

5. The computer system of claim 2 wherein the means for utilizing includes utilizing each said instruction synonym for retrieving a plurality of full width instructions from the storage bank.

6. A method of executing a condensed instruction stream by a processor comprising the steps of:

receiving an instruction including an instruction identifier and a plurality of instruction synonyms within the instruction;

generating at least one full width instruction for each instruction synonym; and executing by said processor said generated full width instructions.

7. The method of claim 6 wherein the step of generating includes utilizing each said instruction synonym for retrieving at least one full width instruction from a storage bank.

8. The method of claim 7 wherein said storage bank is statically stored in read only memory in the processor.

9. The method of claim 7 further comprising the step of receiving instructions to preload the storage bank prior to execution of the instruction stream.

10. The method of claim 7 wherein the step of utilizing includes utilizing each said instruction synonym for retrieving a plurality of full width instructions from the storage bank.

11. An apparatus for executing a condensed instruction stream by a processor comprising:

means for receiving an instruction including an instruction identifier and a plurality of instruction synonyms within the instruction;

means for generating at least one full width instruction for each instruction synonym; and means for executing by said processor said generated full width instructions.

12. The apparatus of claim 11 wherein the means for generating includes means for utilizing each said instruction synonym for retrieving at least one full width instruction from a storage bank.

13. The apparatus of claim 12 wherein said storage bank is statically stored in read only memory in the processor.

14. The apparatus of claim 12 further comprising means for receiving instructions to preload the storage bank prior to execution of the instruction stream.

15. The apparatus of claim 12 wherein the means for utilizing includes utilizing each said instruction synonym for retrieving a plurality of full width instructions from the storage bank.

* * * * *